(12) United States Patent
Beeteson et al.

(10) Patent No.: US 6,975,289 B1
(45) Date of Patent: Dec. 13, 2005

(54) ACTIVE CORRECTION TECHNIQUE FOR A MAGNETIC MATRIX DISPLAY

(75) Inventors: John Stuart Beeteson, Ayrshire (GB); Andrew Ramsay Knox, Ayrshire (GB); Anthony Cyril Lowe, Braishfield (GB)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 09/170,336

(22) Filed: Oct. 13, 1998

(30) Foreign Application Priority Data

May 16, 1998 (GB) .................................. 9810467

(51) Int. Cl.$^7$ .............................................. G09G 3/22
(52) U.S. Cl. ................................................ 345/75.2
(58) Field of Search ........................... 345/74, 75, 86, 345/74.1, 75.2, 75.1, 73, 76, 77; 313/422, 313/431, 433; 315/169.1; 348/673, 687

(56) References Cited

U.S. PATENT DOCUMENTS

| | | | |
|---|---|---|---|
| 3,769,540 A | | 10/1973 | Thomson ...................... 315/12 |
| 5,036,317 A | * | 7/1991 | Buzak ........................ 345/74.1 |
| 5,594,463 A | * | 1/1997 | Sakamoto ..................... 345/76 |
| 5,834,900 A | * | 11/1998 | Tanaka et al. ........... 315/169.1 |
| 5,910,792 A | * | 6/1999 | Hansen et al. ............. 345/74.1 |
| 5,929,828 A | * | 7/1999 | Beeteson et al. ............. 345/74 |
| 6,040,808 A | * | 3/2000 | Knox et al. .................... 345/13 |
| 6,069,598 A | * | 5/2000 | Hansen ........................ 345/74 |
| 6,121,942 A | * | 9/2000 | Sanou et al. ............... 345/75.1 |

FOREIGN PATENT DOCUMENTS

| | | |
|---|---|---|
| EP | 0 539 679 | 5/1993 |
| EP | 0 688 035 | 12/1995 |
| EP | 0 755 042 | 1/1997 |
| GB | 2 127 616 | 4/1984 |
| GB | 2 313 703 | 12/1997 |

OTHER PUBLICATIONS

F G Oess, "The uniform remote virtual cathode system", SID digest 1994, pp 663-666.
Nonomura et al, "A 40-in matrix-driven high-definition flat-panel CRT", SID digest 1989, pp 106-109.

* cited by examiner

Primary Examiner—Xiao Wu
Assistant Examiner—Kevin M. Nguyen
(74) Attorney, Agent, or Firm—Robert M. Trepp; Anne Vachon Dougherty (57) ABSTRACT

A matrix addressed display device having a cathode means and grid electrode means comprising an orthogonal array of parallel row conductors and parallel column conductors in which means are providing for selectively applying cut-off and gain correction information to the row conductors and the column conductors. The cut-off and gain correction information may be applied so as to affect all of the display area equally and correct for warm up drift, or it may be applied so as to correct for the effect of a discrete number of hot cathode filaments being used or it may be applied on a pixel by pixel basis.

11 Claims, 6 Drawing Sheets

FIG. 1

PRIOR ART

ACTIVE CORRECTION TECHNIQUE FOR A MAGNETIC MATRIX DISPLAY

TECHNICAL FIELD

The present invention relates to an active correction technique for matrix driven displays and more particularly to a correction technique for a magnetic matrix display.

BACKGROUND OF THE INVENTION

Displays, and in particular, matrix driven displays are particularly although not exclusively useful for television receivers and visual display units for computers, especially although not exclusively portable computers, personal organisers, communications equipment, and the like.

Figure 1:
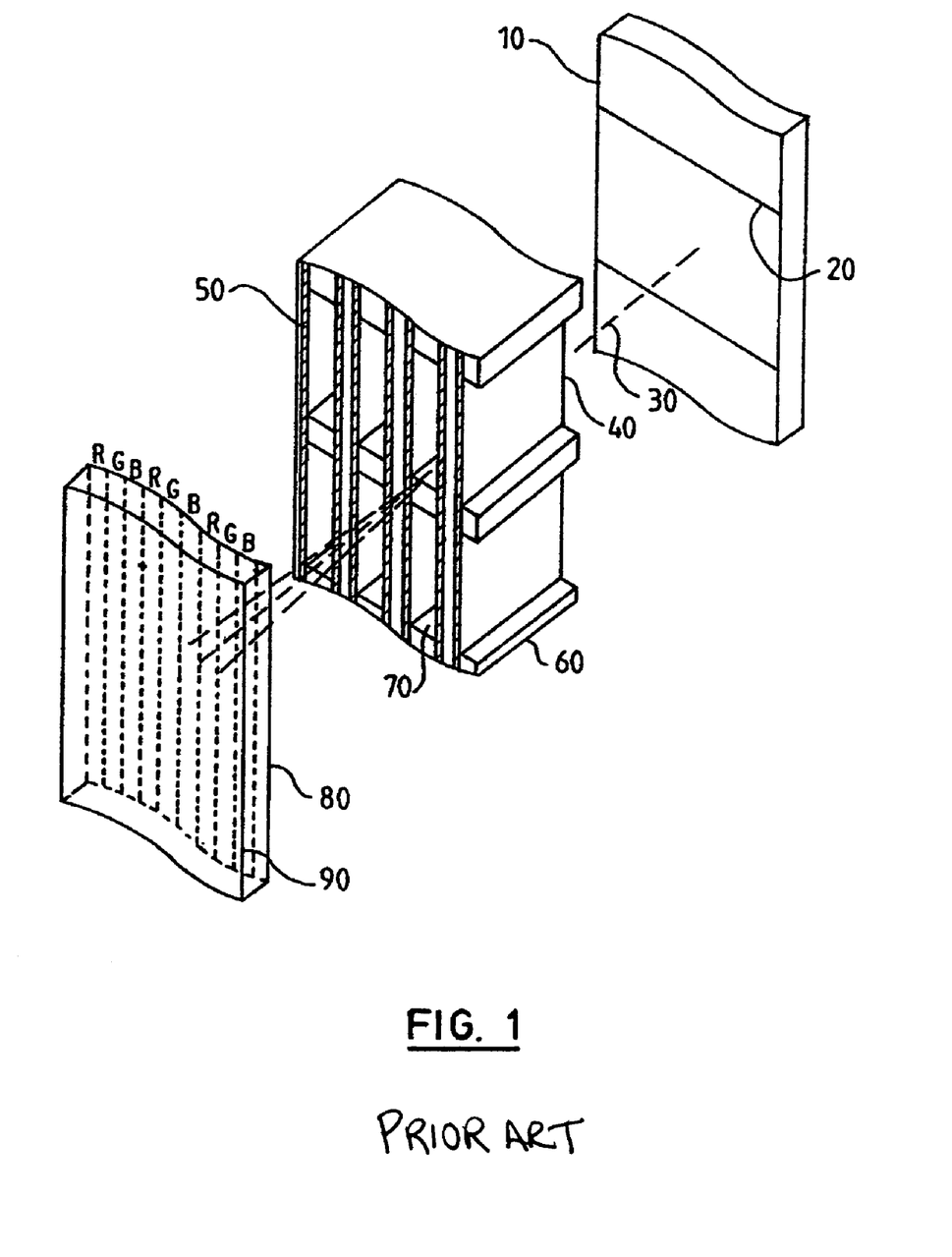
FIG. 1 is an exploded diagram of a prior art magnetic matrix display.

Referring first to FIG. 1, a magnetic matrix display such as that disclosed in UK Patent Application 2304981 comprises: a first glass plate 10 carrying a cathode 20 and a second glass plate 90 carrying a coating of sequentially arranged red, green and blue phosphor stripes 80 facing the cathode 20. A permanent magnet 60 is disposed between glass plates 90 and 10. The magnet is perforated by a two dimension matrix of perforations or "pixel wells" 70. An array of anodes 50 are formed on the surface of the magnet 60 facing the phosphors 80. There is a pair of anodes 50 associated with each column of the matrix of pixel wells 70. The anodes of each pair extend along opposite sides of the corresponding column of pixel wells 70. A control grid 40 is formed on the surface of the magnet 60 facing the cathode 20. The control grid 40 comprises a first group of parallel control grid conductors extending across the magnet surface in a column direction and a second group of parallel control grid conductors extending across the magnet surface in a row direction so that each pixel well 70 is situated at the intersection of a different combination of a row grid conductor and a column grid conductor. In operation, electrons are released from the cathode and attracted towards control grid 40. Control grid 40 provides a row/column matrix addressing mechanism for selectively admitting electrons to each pixel well 70. Electrons pass through grid 40 into an addressed pixel well 70. In each pixel well 70, there is an intense magnetic field. The pair of anodes 50 at the top of pixel well 70 accelerate the electrons through pixel well 70 and provide selective sideways deflection of the emerging electron beam 30. Electron beam 30 is then accelerated towards a higher voltage anode formed on glass plate 90 to produce a high velocity electron beam 30 having sufficient energy to penetrate the anode and reach the underlying phosphors 80 resulting in light output.

The control grid 40 provides a row/column matrix addressing mechanism for selectively admitting electrons to each pixel well 70, which is used to address individual pixels a line at a time. Inevitably there will be small luminance non-uniformities from pixel to pixel. These fall into at least three categories of non-uniformities. The three categories are described individually here as:

1. Luminance changes caused by temperature changes during warm up after initial display switch on. This is particularly a problem in a display using a thermionic cathode as considerable heat is generated in the display by the thermionic cathode.
2. "Washboard" luminance errors typical of a device using thermionic filament cathodes, or a photocathode with backlighting.

Figure 2:
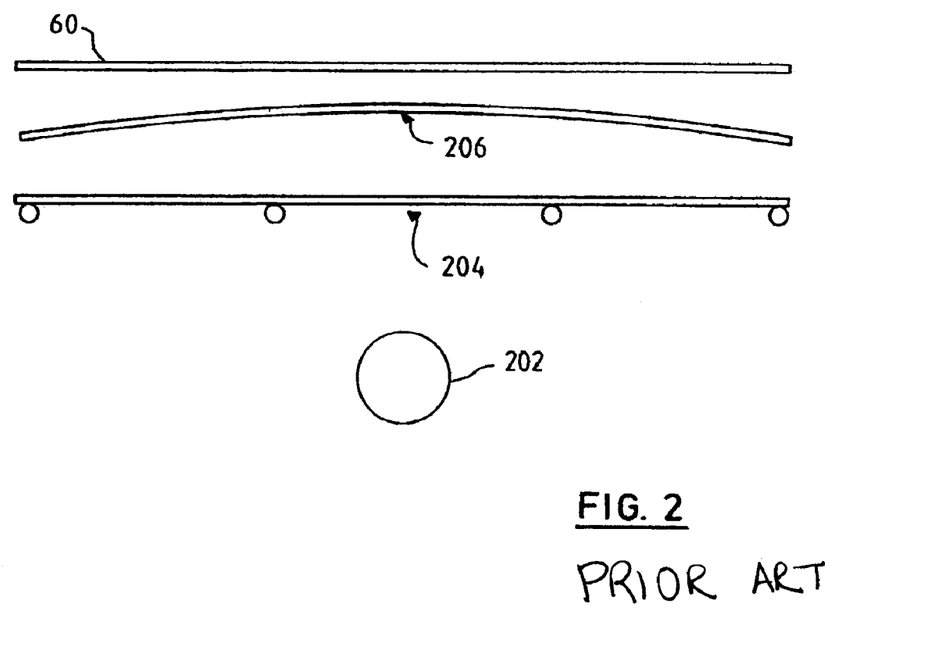
FIG. 2 is a section through the cathode and magnet of FIG. 1 showing a single hot filament cathode.

F G Oess, "The uniform remote virtual cathode system", SID digest 1994", Feb. 23, 1996, discloses that in the design of thermionic area cathodes for flat CRTs it is necessary to create a flat plane of electrons remote from the electron sources. The electron sources are a number of long hot cathode filaments. FIG. 2 shows the electrons associated with a single cathode filament 202 of a multiple hot filament cathode. The filament can be considered in one plane as a point source of electrons and the electron distribution from that one filament is not flat, but is curved with respect to the magnet 60. The cathode extractor grid is shown at 204 and the magnet of the magnetic matrix display at 60. A wavefront of electrons which have been extracted from the single cathode filament 202 and which form a virtual cathode is shown at 206.

Figure 3:
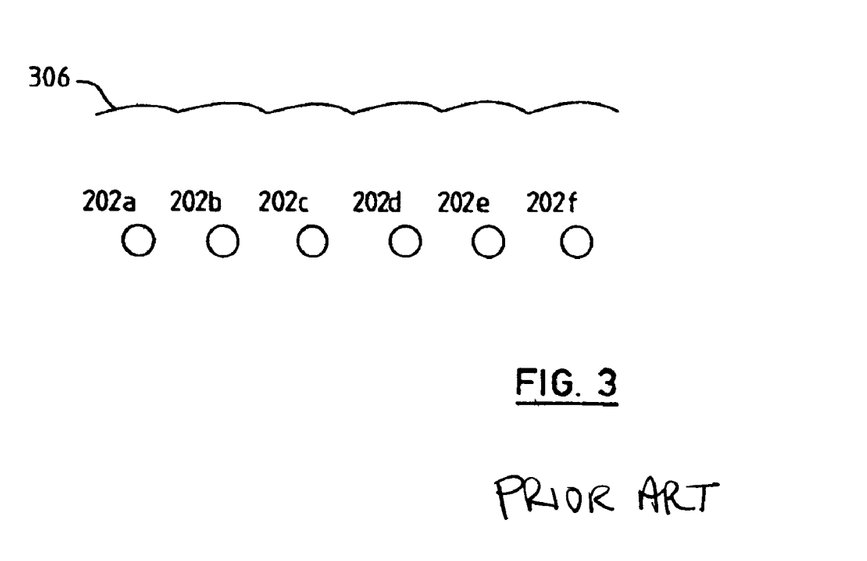
FIG. 3 is a section through the cathode and magnet of FIG. 1 showing multiple hot filament cathodes.

More than one of the filaments shown in FIG. 2 are always used in a practical area cathode. FIG. 3 shows the wavefront 306 of electrons associated with the multiple cathode filaments (202a through 202f) which make up a thermionic area cathode. The curved distribution of electrons from each of the filaments 202a through 202f causes the overall distribution of electrons to be the sum of a number of curves, tending to have a "wavy" structure. This "washboard" problem may be further exacerbated by position tolerance variations in the filament wires.

It is theoretically possible to use one cathode filament at each pixel column or row spacing, when the cathode plane modulation will be exactly coincident with the pixels and hence there will be no brightness modulation observable on the screen. However, this would result in an excessive number of filaments and would be impossible simply because the power requirement would be too large (each filament has to be heated to 750° C.).

U.S. Pat. No. 3,769,540 discloses the use of extra extraction electrodes, for example an extraction "cage" round each filament, but this increases mechanical cost and complexity, and is subject to manufacturing tolerances.

European Patent Application 0 539 679 A discloses that the extraction grid can be shaped into a "counter" curve, but again this is subject to mechanical tolerances.

Extra grids and a repeller can also be added in order to reduce the problem of "washboard" luminance errors, but cost, complexity and tolerances are a problem with such additions.

3. Production tolerances in parameters, such as, for example, magnet hole diameter, grid hole diameter, spacing of electrodes and the like.

Nonomura et al, "A 40" Matrix Driven High Definition Flat-Panel CRT", SID Digest 1989, pp 106–109 describes how variations in cathode emission are compensated in a Colour Flat Panel product, but corrections are applied for cut-off only, to equalise emissions between individual emission wires, and are not applied at an individual pixel level. Neither Nonomura, nor other workers in this field disclose both cut-off and gain tolerance variation correction at the pixel level.

The electrostatic operation of a magnetic matrix display, in particular the key CRT parameters of cut-off voltage and beam current modulation, are controlled by the following equations:

$$V_c = (0.036 \times V_D) + (0.6 \times V_{g2}) \times P \qquad (1)$$

$$I_b = 0.124 \times V_{g2}^{1.4} \times \sqrt{(V_D + 0.011 V_S)} \times P \qquad (2)$$

Where:

$$P = \frac{79.06 \times D^3}{d_{c-g1}^{3/2} \times d_{D-g2} \times [15 + d_{g1-g2}]} \qquad (3)$$

Where:
V$_c$=Cut-off voltage
V$_D$=Deflection anode voltage
V$_{g2}$=G2 voltage (row grid conductor voltage)
P is a constant dependent on the dimensions of the display
I$_b$=Beam current
V$_S$=Screen voltage
D=Aperture diameter
d$_{c\text{-}g1}$ is the dimension from the cathode to G1 (column grid conductor)
d$_{D\text{-}g2}$ is the dimension from the deflection anode to G2 (row grid conductor)
d$_{g1\text{-}g2}$ is the dimension from G1 (column grid conductor) to G2 (row grid conductor)

In the equation for the constant P, the dimensions (d) will vary with manufacturing tolerance. Because P appears in both the cut-off and beam modulation equations then these variations will affect both cut-off and beam modulation.

DISCLOSURE OF THE INVENTION

Accordingly the invention provides a matrix addressed display device comprising: a cathode means; grid electrode means comprising a first plurality of parallel row conductors and a second plurality of parallel column conductors arranged orthogonally to the row conductors. The invention is characterised in that the display device further comprises: means for providing cut-off correction information to one of said first or said second plurality of parallel conductors. The provision of cut-off correction information allows the cut-off of individual rows or columns to be adjusted, so as to reduce luminance variations seen by a user of the display.

Preferably, the display device further comprises means for providing gain correction information to one of said first or said second plurality of parallel conductors. This allows the gain of individual rows or columns to be adjusted, so as to further reduce luminance variations seen by a user of the display.

In a preferred embodiment, the display device further comprises a screen for receiving electron beams modulated by said grid electrode means, the screen having a phosphor coating facing the grid electrode means, the phosphor coating comprising a plurality of pixels each corresponding to a different row and column.

Preferably, the cut-off and gain correction information is provided to the first plurality of parallel conductors, the gain and cut-off correction information being applied to all of said first plurality of parallel conductors.

In a preferred embodiment, the cut-off and gain correction information is chosen so as to compensate for variations in cut-off and gain occurring during warm up.

More preferably, the display device further comprises anode means disposed between said grid electrode means and said screen for accelerating electrons towards the screen, the anode means comprising a plurality of anodes extending parallel to the column conductors, the anode means comprising pairs of anodes each corresponding to a different column conductor, each pair comprising first and second anodes respectively extending along opposite sides of the corresponding column conductor, the first anodes being interconnected and the second anodes being interconnected; and means for providing purity correction information across the first and second anodes so as to compensate for variations in purity occurring-during warm up. This allows for the correction of purity variations during warm up caused by vertical shifts of the electron optics assembly relative to the screen.

Yet more preferably, the display device further comprises temperature sensing means for determining which of said plurality of values of stored cut-off and gain correction information is supplied to a one of said first or said second plurality of parallel conductors. This means that the cut-off and gain correction can be made dependent on the actual operating temperature of the display, rather than just the expected operating temperature of the display, given the time after power is applied.

In a second embodiment, the display device has the cut-off correction information provided to said second plurality of parallel conductors, said cut-off correction information varying according to the physical location of each of said second plurality of parallel conductors. This allows for the correction of "washboard" luminance errors as each column of the display has cut-off separately corrected.

Further, in a second embodiment, the display device has the gain correction information provided to said second plurality of parallel conductors, said gain correction information varying according to the physical location of each of said second plurality of parallel conductors. This also allows for the correction of "washboard" luminance errors as each column of the display has its gain separately corrected.

In a third embodiment, the display device has said cut-off and gain correction information provided to said first plurality of parallel conductors, said cut-off and gain correction information varying according to the physical location of each of said first plurality of parallel conductors and according to which of said second plurality of parallel conductors is selected. This allows active correction at a pixel level, so that, for example, production tolerances in parameters, such as, grid hole diameter, spacing of electrodes and the like may be corrected.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 4:
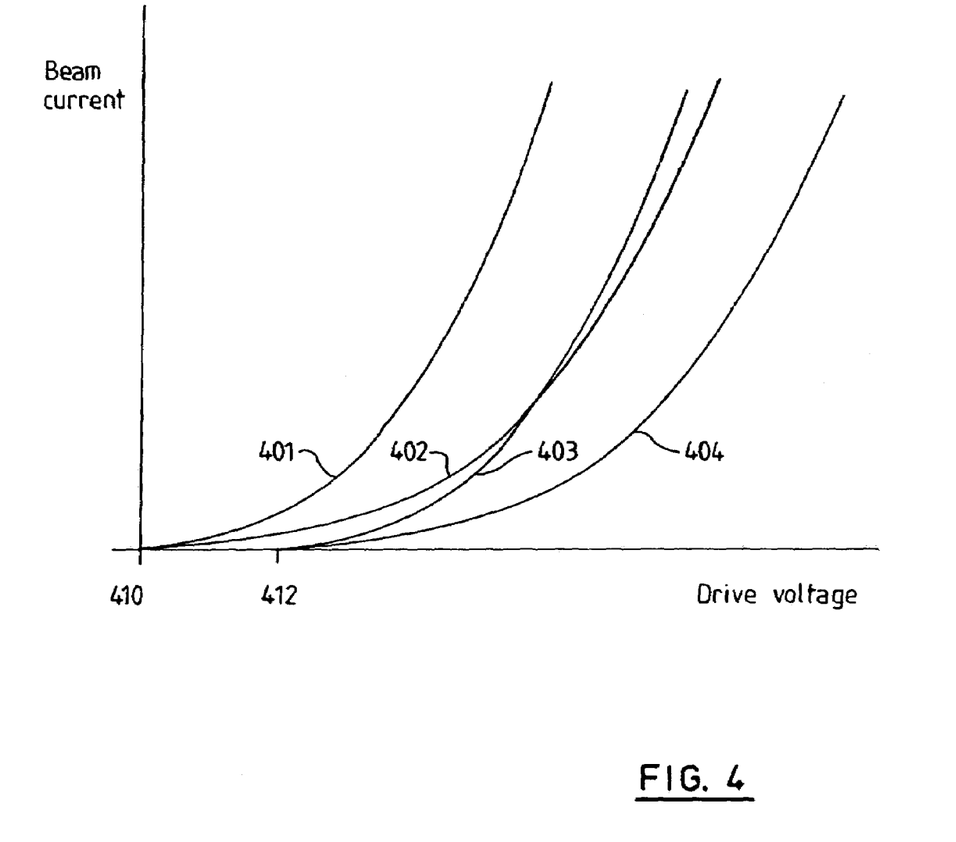
FIG. 4 is a graph showing variations in cut-off voltage and beam current modulation.

FIG. 4 shows a graph of the beam current shown on the y-axis versus drive voltage shown on the x-axis for two different example cathode/grid assemblies with different drive conditions. In example 1, illustrated by curve 401, a display has a cut-off voltage (the drive voltage at which substantially no beam current flows) shown on the x axis by reference numeral 410 and a high gain, shown by the slope of curve 401. In example 2, the cut-off voltage is the same as example 1, but the rate of beam current modulation is lower and is shown by the slope of curve 402. In example 3, the cut-off voltage is higher than that of examples 1 and 2 and is shown on the x axis by reference numeral 412. The rate of beam current modulation is the same as example 1 and is shown by the slope of the curve 403. In example 4, the cut-off voltage is the same as example 3, but the rate of beam current modulation is lower and is shown by the slope of curve 404. These variations of cut-off voltage and beam current modulation may occur between different display types, from sample to sample of a display of the same type, within a single sample as it warms up, within a single sample operating under different ambient conditions or within a single sample as it ages. The cut-off voltage may vary between the values shown at 410 and 412 or outside this range. The values shown are by way of example only. The rate of beam current modulation may vary between the values shown at 410 and 412 or outside this range. The values shown are by way of example only.

The present invention of an active correction technique for use in a matrix addressed display will now be described with reference to each of the at least three categories of luminance non-uniformities present in the prior art described above. The active correction technique can also be applied to the correction of luminance non-uniformities other than those described above.

1. Active Correction During Warm Up

One of the effects which can cause luminance non-uniformity during warm up is the effect of cathode thermal expansion. Thermal expansion effects will occur during warm-up, and may cause visible changes in luminance. Since such thermal expansion is repeatable and reasonably predictable over the warm-up period, in a first embodiment, a time varying correction is applied by storing several correction parameters in a memory, each parameter corresponding to a certain time after power is applied, and using the correction parameter corresponding to the time after power is applied to the display. The same amount of correction is applied to all columns and to all rows of the display. The fixed, digitally stored correction signals are applied to the second group of parallel control grid conductors 40b extending across the magnet surface in a row direction, that is the "row grid conductors", via Digital to Analog Convertors (DACs), in order to adjust cut-off and gain, as described above with reference to FIG. 4 and with reference to equations (1) and (2).

Figure 5:
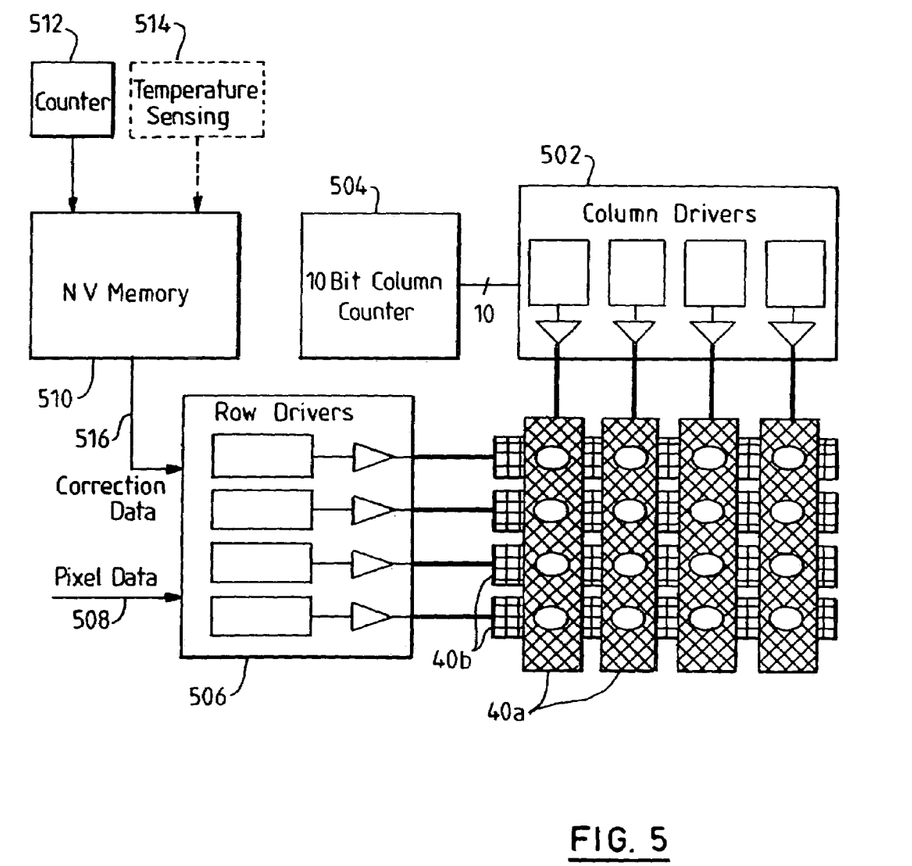
FIG. 5 is a block diagram of a warm up correction technique of the present invention applied to the display of FIG. 1.

FIG. 5 shows an embodiment of the technique described above. The control grid conductors 40 of FIG. 1 as shown as the first group of parallel control grid conductors 40a, that is "column grid conductors", extending across the magnet 60 surface in a column direction and a second group of parallel control grid conductors 40b, "row grid conductors", extending across the magnet 60 surface in a row direction. Each column is provided with a column driver 502. The output of each column driver 502 is connected to corresponding column grid conductor 40a associated with a corresponding column of pixels. Each pixel is thus located at the intersection of a different combination of row grid conductor 40b and column grid conductor 40a. In a first embodiment 1024 column drivers 502 are used and the column drivers 502 are scanned sequentially by a ten bit column counter 504. Ten bits are used such that all 1024 column drivers are addressed sequentially. When a particular column driver is not selected, the column grid conductor 40a connected to that column driver 502 is driven to a non-select voltage, that is a voltage below cut-off, such that regardless of the drive applied to the row grid conductor 40b, no beam current flows in pixels associated with that column. When a column driver 502 is selected, the column grid conductor 40a connected to that column driver 502 is driven to a cutoff voltage, such that the beam current which flows is dependent on the level of drive to the row control grid conductors 40b connected to the row drivers 506.

The level of drive to the row grid conductors 40b is determined by the pixel data supplied at 508, corresponding to the pattern which it is desired to display on the screen, and the correction data 516 supplied from a non-volatile memory 510. The correction data 516 consists of cutoff and gain corrections. Typically, these data are stored with 8 bits representing each value. The 8 bits may be used in various combinations, for example, 4 bits for gain and 4 bits for cutoff or 5 bits for gain, 3 bits for cutoff. The correction data 516 supplied by the non-volatile memory 510 are determined by a counter 512 which is used to cycle through the memory locations in non-volatile memory 510 according to the time since the display was powered on. In this first embodiment, the correction data are unaffected by which of the column drivers 502 is selected and the same correction data are applied to each of the row drivers. The correction data applied varies with time.

The level of row drive is determined by the pixel data 508 supplied and modified by the value of the cutoff correction and gain correction, so as to modify the output of the drivers. The modification of the row driver's output produces a variation in the characteristics of the row drivers such that for a given value of pixel data (which represents a desired display pattern) different drive levels are applied according to the cut-off and gain correction so as to cause the same amount of beam current to flow. This is an effect similar to changing amongst the four different examples described with reference to FIG. 4. However, since several bits are typically stored for each of the cutoff and gain correction, there are many more examples than the four described with reference to FIG. 4.

In a variation of the first embodiment described above, in which the magnet 60 and cathode 20 of the magnetic matrix display have different thermal expansion characteristics, temperature sensing means 514 may be included in the display to monitor the temperature of each of these components. These temperature sensing means 514 may be thermocouples or other devices which produce an output related to the temperature of their surroundings. The temperature sensing means 514 are used to vary the correction factors applied for cut-off and gain correction by changing the memory location from which the correction factors are supplied. This may be done "directly" using, for example, analogue multipliers, or may be performed digitally by use of a micro-controller with associated microcode for control in proportion to the prevailing operating temperature.

The counter 512 may be used solely to control the memory location from which the correction factors are obtained or the temperature sensing means 514 may be used solely to control the memory location from which the correction factors are obtained or they may be used in combination. A single temperature sensing means 514 may be used or a plurality of temperature sensing means 514 may be used.

Figure 6:
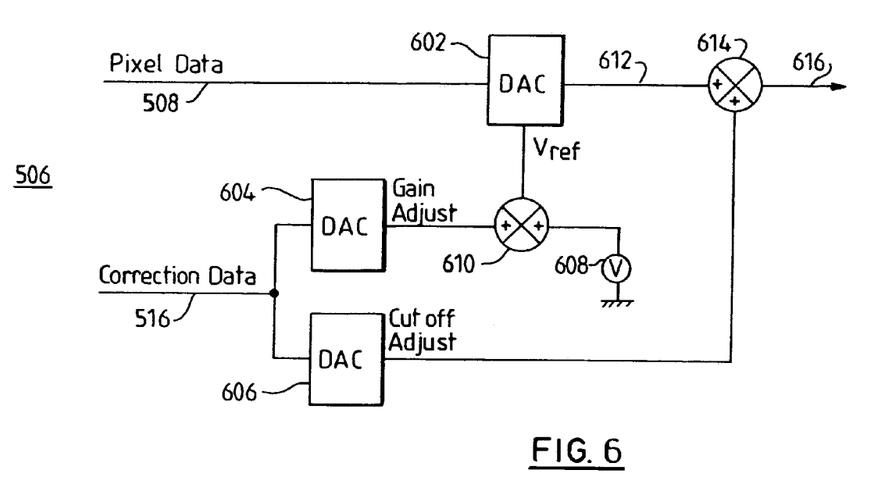
FIG. 6 is a block diagram of a row driver of FIG. 5.

FIG. 6 shows a block diagram of a row driver 506 of FIG. 5. Pixel data 508 are applied to DAC 602 which produces an analog voltage corresponding to the digital input pixel data 508. Correction data 516 from non-volatile memory 510 are applied to a DAC 604 for adjustment of the gain and to a DAC 606 for the adjustment of the cut-off. The gain adjust DAC 604 modifies the reference voltage 608 applied to the DAC 602 by means of an analog addition circuit 610. Alternatively circuit 610 could be a multiplying circuit. The cut-off adjust DAC 606 modifies the output voltage 612 of the DAC 602 by means of an analog addition circuit 614 to produce an output voltage 616 corresponding to the input data 508 value and corrected for gain and cut-off variations. Alternatively circuit 614 could be a multiplying circuit. The correction data 516 are constant during any given pixel period, but in this first embodiment vary with time from power being applied to the display or with the output of the temperature sensing means 514, so as to correct luminance non-uniformities caused by warm up effects.

In a colour magnetic matrix display input pixel data 508 is multiplexed, such that Red, Green and Blue data are presented in sequence to the DAC 602.

Another warm up effect which can be compensated for is that of the correction of purity errors caused by vertical shifts of the magnet 60 position relative to the phosphor screen 90 during warm up. The differential voltage applied to the deflection anodes 50 on either side of the pixel wells 70 can be modified for different screen positions if the phosphor stripes 80 are deposited parallel to the deflection anodes 50 direction. The deflection anodes 50 are driven by similar drivers to those used for the row drivers and the data may be stored in a non-volatile memory either separate from that used for the row drive corrections or in a portion of the same memory. As described above, correction may be implemented "directly" by electronic circuits or under the control of a microcontroller.

2. Correction of "Washboard" Non-Uniformity.

In any matrix driven display, design effects may cause a lack of screen luminance uniformity. These effects are seen in all matrix displays unless steps are taken to control tolerances to very tight levels—which can be both difficult and expensive. Additionally, in a thermionic virtual area cathode where, due to power consumption limitations, insufficient filaments are provided, periodic variations in brightness across the column or the row structure of the display are seen. This defect (sometimes called "washboarding") is common in CRT matrix displays, since there is a desire to reduce the number of cathode filaments in order to minimise power consumption and reduce heat loading.

Figure 7:
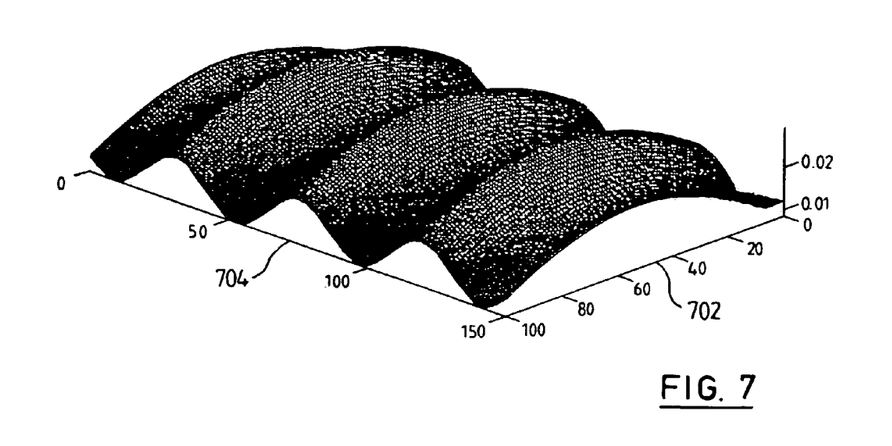
FIG. 7 is a plot of cathode current density associated with the area cathode of FIG. 3.

As an example of the kind of effect this defect has, FIG. 7 shows a plot of the electron wavefront associated with each portion of the cathode 20. The cathode filaments (202 in FIG. 2) run parallel to axis 702 and the "washboard" periodic variation in beam current can be seen across the display along axis 704. In the plot of FIG. 7, a variation along axis 702 in the beam current associated with each portion of the cathode 20 is also shown. This variation is due to manufacturing and position tolerances which will be described later with reference to active correction at a pixel level. The variation is also due to the regions nearer to each end of the filament being cooler and varying as $1/R^2$ (point source, rather than $1/R$ (cylinder).

Figure 8:
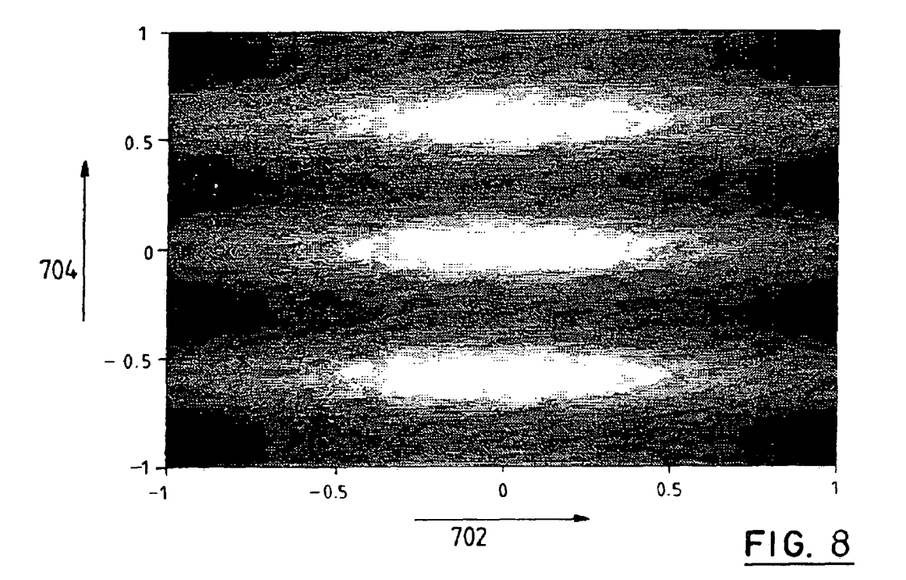
FIG. 8 is a screen display of the image seen by a user of a display having an area cathode having the characteristics of FIG. 7.

FIG. 8 shows how the variation in uncorrected beam current associated with each portion of the cathode 20 is translated into a brightness variation seen by the user.

In a second embodiment of the invention compensation waveforms are applied in a single axis to the grid conductors 40 of the CRT, the grid conductors being used for matrix selection and modulation. In the embodiment disclosed, the correction waveforms are applied to the column grid conductors 40a, as the cathode filaments 202 run in a direction parallel to the column grid conductors 40a. The same amount of correction is applied to all pixels in a given column, but varying amounts of correction are applied to different columns.

The second embodiment is described by reference to a Magnetic Matrix Display (MMD), but is equally applicable to other forms of matrix addressed flat CRT, which use area cathodes and some means of forming electron beams from the electron emission source. The waveforms are easily generated with low cost circuitry and can be applied to existing pins on the row and column line driver I.C's.

In equations (1) to (3) for electrostatic operation, in the P parameter, the dimensions are fixed, except for the column grid conductor (G1) to cathode plane distance $d_{c\text{-}g1}$, because this is affected by the electron wavefront variations discussed above. Because P appears in both the cut-off and beam modulation equations then this distance variation does affect both.

In the second embodiment of the present invention, it is accepted that the cut-off voltage and gain may change for different columns. To compensate for this, a correction voltage is applied to the column drivers to equalise the values of cutoff voltage and gain and hence eliminate any brightness variation on the screen. This is done by generating an analogue correction waveform in synchronism with the matrix addressing.

The second embodiment of the present invention is described as having a complete column of pixels illuminated from the row drivers, and the column of pixels being illuminated is progressively scanned across the screen by incrementing the column driver which is selected. The present invention can however equally be applied to row scanning systems.

Referring to FIG. 5, the column drivers are connected to the column grid conductors. The column drivers apply one of two analogue d.c. voltage levels to the column grid conductors, either a non-select level chosen to ensure that no pixels are ever illuminated irrespective of the voltage on the row grid conductors, or a cut-off level, chosen to bring the column grid conductor to a voltage that ensures negligible beam current with zero row grid driver voltage.

In the second embodiment of the invention, the d.c. level used for cut off is replaced by an analogue waveform, synchronised to the column scan, so that when a column is taken to the cut-off level the voltage applied to a column grid conductor is modified to bring the applied voltage to match the actual cut-off voltage of the column due to the cathode to column grid conductor distance variation produced by the area cathode.

Figure 9:
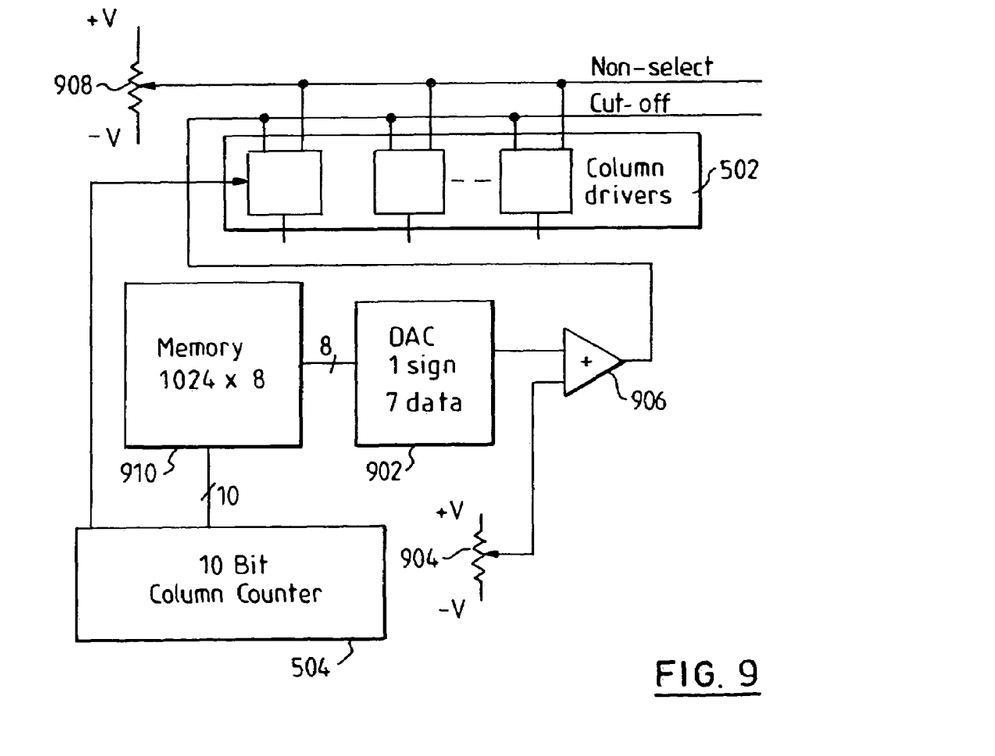
FIG. 9 is a block diagram of a "washboard" correction technique of the present invention applied to the display of FIG. 1.

FIG. 9 shows a block diagram of the second embodiment of the invention. 10 Bit column counter 504 operates with column drivers 502 as described above with reference to FIG. 5. Additionally, the 10 bit digital output from counter 504 is used to address a memory 910 having 10 address lines, that is having 1024 different addresses. At each address is stored correction data, 8 bits in the example embodiment. In the preferred embodiment, a non-volatile 8 kbit memory is used. The data associated with the address presented on the address lines of memory 910 are applied to the input of DAC 902 which interprets the eight bits of data as one bit sign, seven bits magnitude. The analog output voltage of this DAC is added by adder 906 to a reference voltage generated by adjustable voltage source 904 to form a cut-off voltage value compensated for variations in the actual cut-off value for each column of the display. A non-select voltage for the column drivers 502 is also generated by adjustable voltage source 908. The non-select voltage ensures that no pixels are ever illuminated irrespective of the voltage on the row grid conductors and so this voltage does not need to be compensated for varying actual cut-off voltages for different columns. In this second embodiment, the correction data are affected by which of the column drivers is selected, but the same correction data are applied to each of the row drivers.

The operating frequency of the circuit is relatively low (76.8 KHz at a 75 Hz frame refresh rate) so that low cost digital chips and DACs can be used. The values stored in memory 910 for the correction waveform can be totally predetermined or can be updated to improve the accuracy of correction by measurement of the display during manufacturing set up. Alternatively, the stored values can be determined by calibration in service by a user, using a computer program designed for that purpose.

In a variation of the second embodiment, the cathode filaments 202 run in a direction parallel to the row grid conductors 40*a*. The row drivers 506 create the modulated beam current for each pixel in a selected column and all rows are driven simultaneously. These row drivers 506 each contain a DAC 602, which has a reference voltage, to which the output voltage is proportional to. To correct the gain equation for each illuminated column, the circuit of FIG. 9 is used, but the correction waveform is used to modulate the reference voltage in the same manner as the output voltage of DAC 604 is used to correct for warm up drift. The same amount of correction is applied to all the row drivers, but varying amounts of correction are applied when different columns are selected. If a reference voltage pin is not available (for example, if an internal reference is used) then the DAC may be operated such that the waveform may be fed to the analogue level power supply rail. Correction levels can be updated during manufacturing set up or in service if required.

3. Active Correction at the Pixel Level

In any matrix driven display, manufacturing tolerances or design effects may cause a lack of screen luminance uniformity. These effects are seen in all matrix displays unless steps are taken to control tolerances to very tight levels—which can be both difficult and expensive. In the particular case of a Magnetic Matrix Display (MMD) there are two specific causes of luminance non-uniformity. The first is that of manufacturing tolerances such as in the diameter of the holes in grid electrode 40, the spacing of electrodes such as cathode 20, grid electrode 40, deflection anodes 50 and the like. The second area is in the thermionic virtual area cathode where position tolerance variations in filament wires may occur. To achieve two axis compensation requires corrections to be applied on an individual pixel level, and the third embodiment of the invention provides such a technique.

Correcting the cut-off and gain of each pixel is a two stage process. Firstly, the black level (cut-off) must be set-before the gain adjustment is made. This is because the black level is the zero beam current reference for the pixel and increases in beam current due to DAC drive voltage are taken from this starting point.

The cut-off correction is made using the row grid conductor 40*b*. This is because the column grid conductor 40*a* is common to an entire column of active pixels and so individual pixel control is not possible. The cut-off voltage variation by means of row grid conductor 40*b* correction is much less sensitive than cut-off variation by column grid conductor 40*a* since most of the row grid conductor 40*b* is shielded by the column grid conductor 40*a* (co-pending GB patent application 9711744 discloses the use of variable aperture diameters for column grid conductors and row grid conductors). Hence the correction range which must be made available on the row grid conductors 40*b* for cut-off is much greater than would normally be applied to the column grid conductors 40*a*. Further, this correction voltage on the row grid conductors 40*b* is signed, that is a more positive or a more negative voltage will need to be added to the row grid conductor 40*b* in order to establish the correct cutoff voltage. However, since extremely low beam currents are involved at the cut-off level, the resolution of adjustment need not be high.

In the described embodiment, a 4 bit number is used for cut-off correction. This is composed of a sign bit and three magnitude bits, giving a total of +7/−8 adjustment levels about a nominal level. Since the row grid conductors are relatively lacking in sensitivity due to shielding by the column grid conductors, a 1.5V adjustment range is used, providing 100 mV adjustment steps.

In order to avoid the need for the output voltage to be capable of driving both positive and negative voltages, the actual DAC output voltage is always positive or zero volts. The row driver DAC output is set to a lower value than the final desired output such that the composite output is at the nominal value when the cut-off correction data is centred in its DAC range. Table 1 below shows the correction voltages and the DAC outputs for various input digital data combinations.

TABLE 1

Correction voltages and DAC outputs for various input digital data combinations

| Sign bit | Data bits | Correction Voltage | DAC Output Voltage | |
|---|---|---|---|---|
| 0 | 000 | −800 mV | 0 mV | |
| 0 | 001 | −700 mV | 100 mV | |
| 0 | 010 | −600 mV | 200 mV | |
| 0 | 011 | −500 mV | 300 mV | |
| 0 | 100 | −400 mV | 400 mV | |
| 0 | 101 | −300 mV | 500 mV | |
| 0 | 110 | −200 mV | 600 mV | |
| 0 | 111 | −100 mV | 700 mV | |
| 1 | 000 | 0 mV | 800 mV | Nominal row grid conductor voltage |
| 1 | 001 | 100 mV | 900 mV | |
| 1 | 010 | 200 mV | 1.0 V | |
| 1 | 011 | 300 mV | 1.1 V | |
| 1 | 100 | 400 mV | 1.2 V | |
| 1 | 101 | 500 mV | 1.3 V | |
| 1 | 110 | 600 mV | 1.4 V | |
| 1 | 111 | 700 mV | 1.5 V | |

The apparent cut-off voltage change depends on the relative geometry of the grids, cathode and aperture diameter.

As shown in FIG. 6, the correction voltage produced is summed with the DAC output voltage and it is this composite voltage that is connected to the row grid conductor of the display. Once the cut-off value has been established, it is then necessary to produce the correct voltage on each row grid conductor to provide luminance uniformity.

In the described embodiment of the present invention, the point at which luminance uniformity is corrected is defined as at the top end of the DAC scale, that is, a full white screen of maximum intensity. With reference to the graph of FIG.

4, this will "fix" both ends of the transfer curve. Any variations in the Beam current/Drive voltage transfer curve of individual pixels between these points is typically small, manifesting themselves as inter pixel gamma variations, and should not be visible to the display user.

Since a significant voltage swing may needed on the row grid electrode for cut-off correction, the voltage compliance range of the row driver needs to be considered. This may be done by examining the possible corrections required. There are three possible "states" for each of cut-off and gain. These are shown in table 2 below:

TABLE 2

Possible states for row driver correction

| Cut-off adjustment | Gain adjustment | Case |
| --- | --- | --- |
| Negative | Negative | 1 |
| Negative | None | 2 |
| Negative | Positive | 3 |
| None | Negative | 4 |
| None | None | 5 |
| None | Positive | 6 |
| Positive | Negative | 7 |
| Positive | None | 8 |
| Positive | Positive | 9 |

Typically, a +/−100 mV (effective) adjustment range for cut-off voltage is needed, and this reflects as a +/−700 mV adjustment range on the row grid conductor 40b, and typically a +/−500 mV adjustment range for gain variation is needed on the DAC 602 output. From these requirements, the worse case values of row grid conductor range can be found as case 3. Assume the nominal value for maximum gain is 3V. Then the worse case total swing needed on the row grid conductor 40b is from (0V−0.7V to (3V+0.5V), that is a 4.2V swing. A low voltage IC can be used for this voltage range. The row driver DAC 602 works by producing an output voltage 612 which is a function of the input digital data 508 and a reference voltage 608 supplied to the DAC 602. It is common practice to adjust the desired output voltage of a DAC, such as DAC 602 by adjusting the reference voltage 608. The effect is to change the voltage increment step size produced. Adjustment of the reference voltage 608 for gain correction is a convenient method of implementation. Referring to FIG. 6, a below nominal voltage reference 608 is produced. This is then summed using adding circuit 610 with a voltage produced from the gain correction data 516 and this composite voltage is then used as the reference voltage for the row driver DAC 602. Since only relatively small changes in the row driver DAC 602 reference voltage are required, this implementation provides high adjustment resolution about the nominal value without the need for a high resolution DAC. If the total reference voltage were to be produced, a greater number of bits (and higher data storage space) would be required.

The correction values are obtained during manufacturing set up by either a brightness or beam current measurement (beam current can be measured as described later). These are stored in a non volatile memory 510. In this third embodiment, correction is being done at a pixel level, so correction data has to be stored for each pixel. The resolution required is determined by experiment, and is affected by the precision selected for the manufacturing processes. However, typically cut-off and gain each require 4 bits of correction. In an XGA display capable of displaying a screen of 1024 by 768 pixels, storage for 1024×768×4×2 bits is required, that is equivalent to under 1 Mbyte.

By putting the correction DACs into each row driver 506, there is an increase in chip circuit complexity by a factor of nearly three, but a magnetic matrix display has an inherent advantage over other matrix displays in that only one driver chip is required per pixel instead of per colour sub-pixel, so the complexity is not increased over that required for a Liquid Crystal Display (LCD). A Magnetic Matrix Display uses CMOS drive voltage levels (5V) so that low cost integrated circuit processes can be used. To keep driver pin count down and further reduce cost, it is possible to serialise the correction data and feed this into shift registers in the driver chip. Data rates would be low, at under 1 Mbit/s.

Before the correction system can be used to provide correction, the errors have to be measured on an individual pixel basis. Typically, this is a part of manufacturing set up process. This can be done by measurement of brightness using a vision system, which has the advantage of compensating for all tolerances including phosphors, but experience with CRTs indicates that phosphor errors are not significant and a simpler technique might be to measure beam current by illuminating each pixel in turn and measuring the EHT return current. This particular measurement is sometimes noisy, but since this can easily be automated, it would be a simple matter to average over many samples or preferably to slow the scan rate down in the measurement fixture to reduce measurement bandwidth and so increase the signal to noise ratio.

The algorithm for this measurement is first to set the drive signal to zero and to increment the cut-off correction value until a minimum black level is detected, which therefore fixes the cut-off correction for that pixel. Then the drive signal is set to maximum and the gain correction value is incremented until a predetermined required brightness is reached, which fixes the gain correction value for that pixel. Each pixel is set in turn until the whole display has been set up.

Since such a set up process can be automated, it also gives the advantage of a correction mode that can be made available to the user, to allow for correction of long term drift during the life of the display.

What is claimed is:

1. A matrix addressed display device comprising:
   a cathode means;
   grid electrode means comprising a first plurality of parallel conductors comprising more than one row of parallel row conductors and a second plurality of parallel conductors comprising more than one column of parallel column conductors arranged orthogonally to the row conductors; and
   temperature sensing means for sensing temperature of said device;
   characterised in that the display device further comprises:
   means for dynamically determining cut-off correction information based on temperature sensed by said temperature sensing means and for providing cut-off correction information to only one of said first plurality of parallel conductors or said second plurality of parallel conductors.

2. A display device as claimed in claim 1 further comprising means for providing gain correction information to one of said first or said second plurality of parallel conductors.

3. A display device as claimed in claim 2 further comprising a non-volatile memory for storing a plurality of values for said cut-off and gain correction information.

4. A display device as claimed in claim 3, further comprising a screen for receiving electron beams modulated by said grid electrode means, the screen having a phosphor coating facing the grid electrode means, the phosphor coating comprising a plurality of pixels each corresponding to a different row or column.

5. A display device as claimed in claim 3, wherein said cut-off and gain correction information is provided to said first plurality of parallel conductors, said gain and cut-off correction information being applied to all of said first plurality of parallel conductors.

6. A display device as claimed in claim 3, wherein said cut-off and gain correction information is chosen so as to compensate for variations in cut-off and gain occurring during warm up.

7. A display device as claimed in claim 6, further comprising:
- anode means disposed between said grid electrode means and said screen for accelerating electrons towards the screen, the anode means comprising a plurality of anodes extending parallel to the column conductors, the anode means comprising pairs of anodes each corresponding to a different column conductor, each pair comprising first and second anodes respectively extending along opposite sides of the corresponding column conductor, the first anodes being interconnected and the second anodes being interconnected; and
- means for providing purity correction information across the first and second anodes so as to compensate for variations in purity occurring during warm up.

8. A display device as claimed in claim 6, further comprising temperature sensing means for dynamically determining which of said plurality of values of stored cut-off and gain correction information is to be supplied to a one of said first or said second plurality of parallel conductors based on currently-sensed temperature.

9. A display device as claimed in claim 3, wherein said cut-off correction information is provided to said second plurality of parallel conductors, said cut-off correction information varying according to the physical location of each of said second plurality of parallel conductors.

10. A display device as claimed in claim 3, wherein said gain correction information is provided to said second plurality of parallel conductors, said gain correction information varying according to the physical location of each of said second plurality of parallel conductors.

11. A display device as claimed in claim 3, wherein said cut-off and gain correction information is provided to said first plurality of parallel conductors, said cut-off and gain correction information varying according to the physical location of each of said first plurality of parallel conductors and according to which of said second plurality of parallel conductors is selected.

\* \* \* \* \*